US008223778B2

(12) United States Patent
Scott et al.

(10) Patent No.: US 8,223,778 B2
(45) Date of Patent: *Jul. 17, 2012

(54) ROUTING TABLE ARCHITECTURE

(75) Inventors: Steven L. Scott, Chippewa Falls, WI (US); Robert Alverson, Chippewa Falls, WI (US)

(73) Assignee: Intel Corporation, Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/932,457

(22) Filed: Oct. 31, 2007

(65) Prior Publication Data

US 2008/0123679 A1    May 29, 2008

Related U.S. Application Data

(63) Continuation of application No. 11/825,618, filed on Jul. 5, 2007, now abandoned, which is a continuation of application No. 11/600,339, filed on Nov. 14, 2006, now abandoned, which is a continuation of application No. 11/439,382, filed on May 22, 2006, now abandoned, which is a continuation of application No. 11/358,931, filed on Feb. 21, 2006, now abandoned, which is a continuation of application No. 11/172,460, filed on Jun. 30, 2005, now abandoned, which is a continuation of application No. 10/992,504, filed on Nov. 18, 2004, now abandoned.

(60) Provisional application No. 60/523,256, filed on Nov. 19, 2003, provisional application No. 60/523,361, filed on Nov. 19, 2003, provisional application No. 60/523,241, filed on Nov. 19, 2003.

(51) Int. Cl.
*H04L 12/28* (2006.01)

(52) U.S. Cl. .......................................................... 370/401
(58) Field of Classification Search ........................ None
See application file for complete search history.

(56) References Cited

U.S. PATENT DOCUMENTS

| 5,138,615 | A | * | 8/1992 | Lamport et al. | 370/400 |
|---|---|---|---|---|---|
| 5,721,819 | A | * | 2/1998 | Galles et al. | 709/243 |
| 5,850,395 | A | * | 12/1998 | Hauser et al. | 370/398 |
| 5,898,687 | A | * | 4/1999 | Harriman et al. | 370/390 |
| 5,970,232 | A | * | 10/1999 | Passint et al. | 709/238 |
| 6,137,781 | A | * | 10/2000 | Goto et al. | 370/255 |
| 6,160,811 | A | * | 12/2000 | Partridge et al. | 370/401 |
| 6,167,444 | A | * | 12/2000 | Boden et al. | 709/223 |
| 6,192,051 | B1 | * | 2/2001 | Lipman et al. | 370/389 |

(Continued)

*Primary Examiner* — Ayaz Sheikh
*Assistant Examiner* — Faiyazkhan Ghafoerkhan
(74) *Attorney, Agent, or Firm* — Blakely, Sokoloff, Taylor & Zafman LLP

(57) ABSTRACT

A system and method for routing a packet between ports for use in a router having a plurality of ports, including a first and a second port, wherein each port includes a plurality of look-up tables (LUTs) and a look-up table select connected to the LUTs. Routing information is loaded into each of the plurality of LUTs while LUT selection information is loaded in the look-up table select. A packet having a plurality of destination bits is received at the first port and a destination port selected within the router to receive the packet. The destination port is selected by applying two or more of the destination bits to the plurality of LUTs in the first port and selecting an output of the plurality of LUTs as a function of one or more of the destination bits, wherein the selected output indicates the port selected to receive the packet. The packet is then routed to the output of the selected port.

12 Claims, 10 Drawing Sheets

U.S. PATENT DOCUMENTS

| | | | |
|---|---|---|---|
| 6,324,613 B1* | 11/2001 | Aguilar et al. | 710/316 |
| 6,363,077 B1* | 3/2002 | Wong et al. | 370/422 |
| 6,741,552 B1* | 5/2004 | McCrosky et al. | 370/218 |
| 6,839,794 B1* | 1/2005 | Schober | 710/316 |
| 6,977,930 B1* | 12/2005 | Epps et al. | 370/392 |
| 7,002,976 B2* | 2/2006 | Dupont | 370/404 |
| 7,269,348 B1* | 9/2007 | Tse-Au | 398/25 |
| 7,401,126 B2* | 7/2008 | Pekkala et al. | 709/217 |
| 7,558,268 B2* | 7/2009 | Wybenga et al. | 370/395.31 |
| 2002/0051458 A1* | 5/2002 | Carvey et al. | 370/401 |
| 2002/0199203 A1* | 12/2002 | Duffy et al. | 725/109 |
| 2003/0066042 A1* | 4/2003 | Teig et al. | 716/13 |
| 2003/0088694 A1* | 5/2003 | Patek et al. | 709/238 |
| 2003/0126233 A1* | 7/2003 | Bryers et al. | 709/219 |
| 2004/0022245 A1* | 2/2004 | Forbes et al. | 370/392 |
| 2004/0223502 A1* | 11/2004 | Wybenga et al. | 370/401 |
| 2006/0050690 A1* | 3/2006 | Epps et al. | 370/359 |
| 2009/0172259 A1* | 7/2009 | Prins et al. | 711/103 |

* cited by examiner

| 14 | 13 | 12 | 11 | 10 | 9 | LUT SEL |
|---|---|---|---|---|---|---|
| 0 | 0 | 0 | X | X | X | 0 |
| 0 | 0 | 1 | X | X | X | 1 |
| 0 | 1 | 0 | 0 | X | X | 6 |
| 0 | 1 | 0 | 1 | X | X | 7 |
| 0 | 1 | 1 | 0 | 0 | 0 | 2 |
| 0 | 1 | 1 | 0 | 0 | 1 | 3 |
| 0 | 1 | 1 | 0 | 1 | 0 | 4 |
| 0 | 1 | 1 | 0 | 1 | 1 | 5 |
| 0 | 1 | 1 | 1 | X | X | 0 |
| 1 | 0 | X | X | X | X | 0 |
| 1 | 1 | 0 | 0 | X | X | 7 |
| 1 | 1 | 0 | 1 | X | X | 1 |
| 1 | 1 | 1 | X | X | X | 6 |

ROUTING TABLE ARCHITECTURE

CROSS-REFERENCE TO RELATED APPLICATIONS

This application is a continuation application of U.S. patent application Ser. No. 11/825,618 filed Jul. 5, 2007 now abandoned, which is a continuation application of U.S. patent application Ser. No. 11/600,339 filed Nov. 14, 2006 now abandoned, which is a continuation application of U.S. patent application Ser. No. 11/439,382 filed May 22, 2006 now abandoned, which is a continuation application of U.S. patent application Ser. No. 11/358,931 filed Feb. 21, 2006 now abandoned, which is a continuation application of U.S. patent application Ser. No. 11/172,460 filed Jun. 30, 2005 now abandoned, which is a continuation application of U.S. patent application Ser. No. 10/992,504, entitled "Massively Parallel Processing Supercomputer" and filed Nov. 18, 2004 now abandoned, which claims priority to U.S. Provisional Applications No. 60/523,256, entitled "MASSIVELY PARALLEL PROCESSING SUPERCOMPUTER," filed Nov. 19, 2003; No. 60/523,361, entitled "MESSAGE ROUTING UNIT," filed Nov. 19, 2003, and No. 60/523,241, entitled "RESILIENCY COMMUNICATIONS ARCHITECTURE," filed Nov. 19, 2003, all of which are incorporated herein in their entirety by reference.

This application is related to U.S. patent application Ser. No. 11/932,413, entitled "Reduced Arbitration Routing System and Method", filed on even date herewith, which is incorporated herein by reference.

BACKGROUND OF THE INVENTION

1. Field of the Invention

The present invention is relates generally to the field of high-speed digital data processing systems, and more particularly to systems and methods of routing packets in multiprocessor computer systems.

2. Background Information

High-end multiprocessor computer systems typically consist of nodes interconnected by physical communication links. Often the physical links connect the nodes in a multidimensional topology. Router logic connected to the physical links routes packets through the interconnect network to their destination nodes as a function of a destination code or address associated with each destination node. The appropriate route is typically selected using a routing table located on each processor node.

Routing tables can, however, get prohibitively expensive as the number of nodes in the system increase. A routing table architecture that reduces the number of entries needed is detailed by Galles et al. in "Programmable, Distributed Network Routing," in U.S. Pat. No. 5,721,819, issued Feb. 24, 1998. An alternate routing table architecture is detailed by Passint et al. in "Router Table Lookup Mechanism," in U.S. Pat. No. 5,970,232, issued Oct. 19, 1999. Both approaches use a local/remote approach in which a local table is used to route to nodes close to the node forwarding the packet and a remote table is used to route packets in a direction that is generally in the direction of the destination node. Since routing to the remote node is done in a general manner, fewer entries are needed to handle all the possible destination codes.

Such approaches are effective in reducing the number of entries needed to implement a routing table in each node, but at the cost of reduced routing flexibility. What is needed is an efficient yet flexible system and method for implementing programmable routing tables in multiprocessor systems.

BRIEF DESCRIPTION OF THE DRAWINGS

FIG. 7 illustrates routing with the look-up table;

DETAILED DESCRIPTION OF THE INVENTION

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
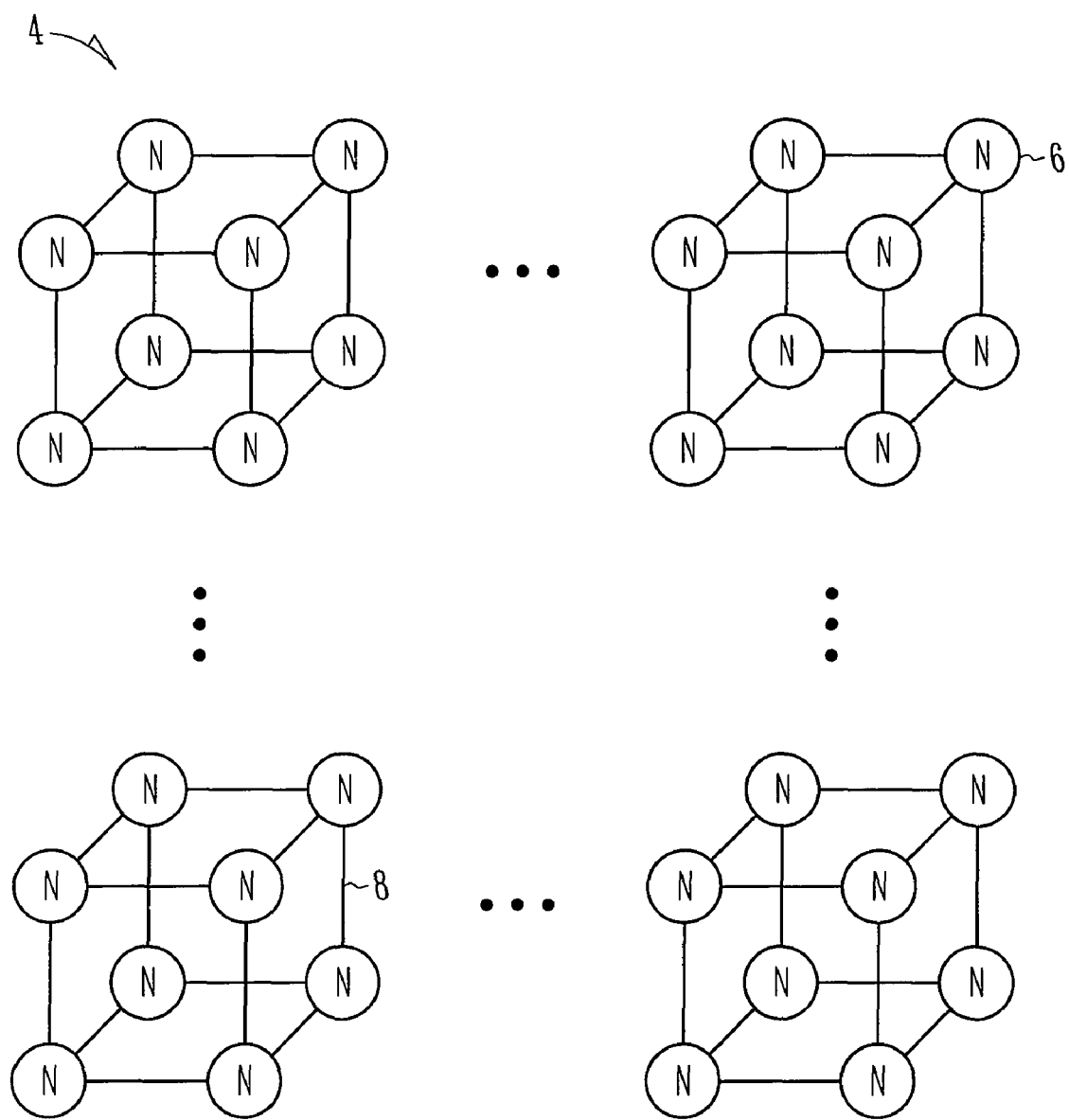
FIG. 1 illustrates a computer system according to the present invention.

A computer system 4 having a plurality of processor nodes 6 connected by links 8 is shown in FIG. 1. Each node 6 includes a router (not shown) used to route packets across links 8 in the manner to be described below.

Figure 2:
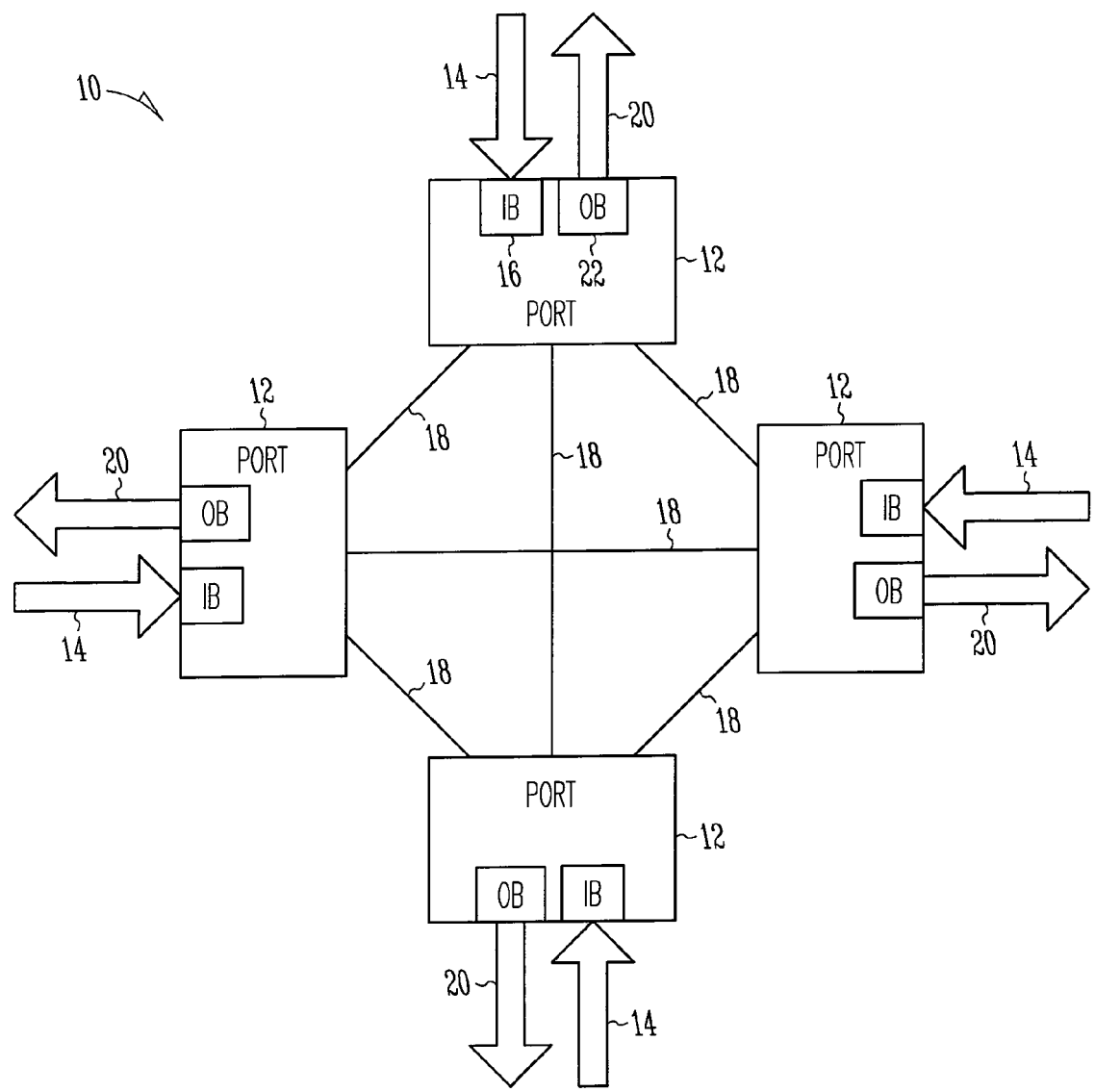
FIG. 2 illustrates a router that can be used in the computer system of FIG. 1.

One router which can be used in processor node 6 of computer system 4 is shown in FIG. 2. Router 10 includes four network ports 12 and a data path 18 connecting each network port 12 to each of the other network ports 12. Each network port includes an input 14, an input buffer 16, an output 20, and an output buffer 22. In one embodiment, data paths 18 between each of the network ports 12 are formed using a crossbar switch. Embodiments of router 10 are described in related U.S. patent application Ser. No. 11/932,413, entitled "Reduced Arbitration Routing System and Method", filed on even date herewith, the descriptions of which is incorporated herein by reference.

Router 10 uses a distributed routing table mechanism where a look up table (LUT) at each input port is used to determine the output port. In one embodiment, all routing is virtual cut through, where packets are allowed to move to the destination buffer only if the entire packet fits. This prevents subsequent packets from blocking due to a packet that is straddling a buffer.

Router 10 achieves high performance through a combination of simple arbitration and large buffering. In one embodiment, all routes are traversed using dimension order routing, with the order of traversal being X, Y and then Z dimension.

In one embodiment, each network port 12 supports a plurality of virtual channels. In one embodiment, each input buffer includes a virtual channel input buffer for each virtual channel. Each virtual channel input buffer is capable of storing at least one packet.

In one embodiment, input 14 and output 20 cooperate to form a fall duplex communication channel.

Figure 3:
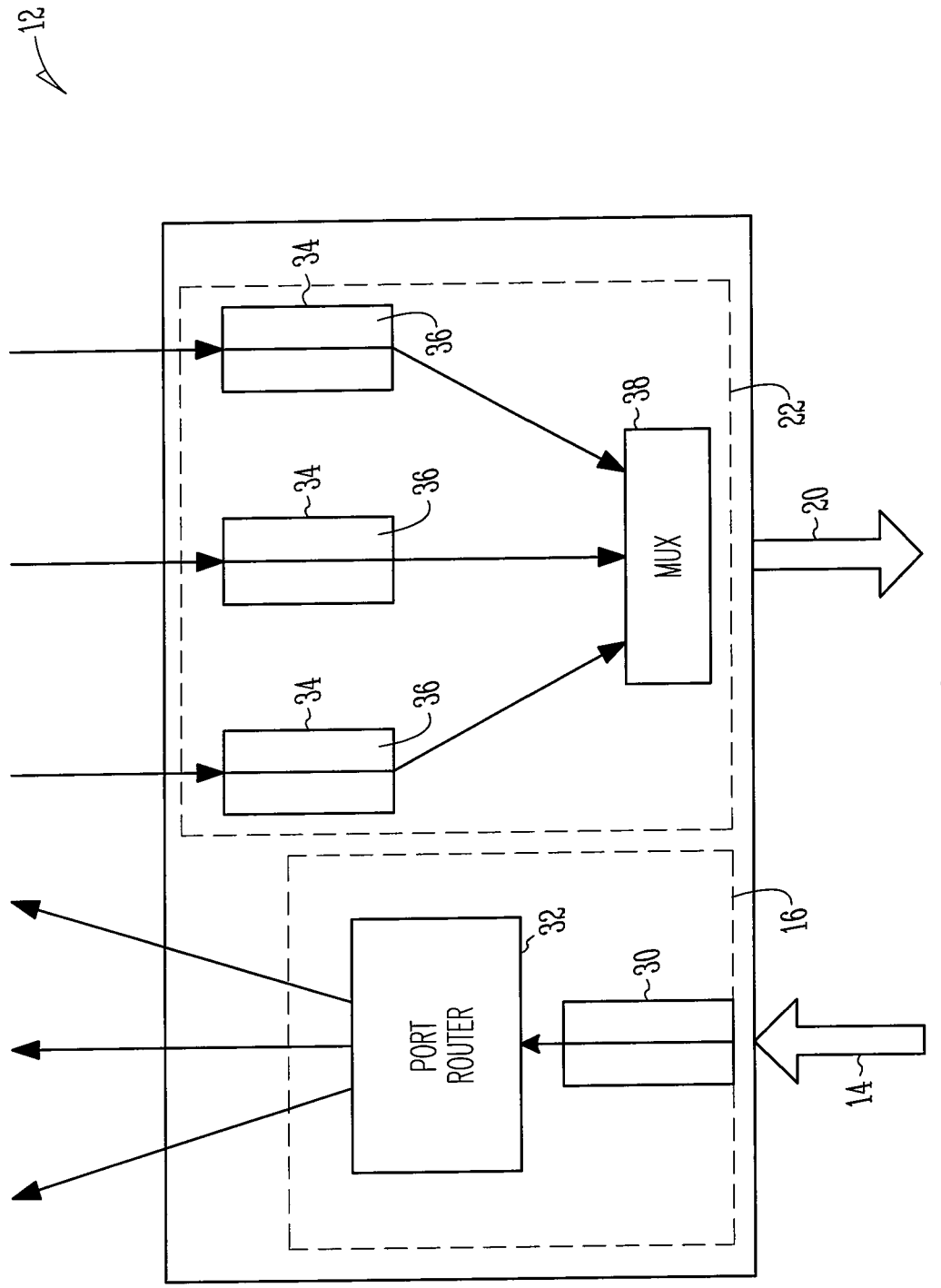
FIG. 3 illustrates a network port.

One embodiment of a network port 12 is shown in FIG. 3. In the network port 12 shown in FIG. 3, router 10 supports two virtual channels. Each input buffer 16, therefore, includes two virtual channel input buffers 30 and a port router 32. Port router 32 takes a packet from one of the input buffers 30 and forwards it to one of the other network ports 12 in the manner that will be described below.

Each output buffer 22 includes three staging buffers 34 and a multiplexer 38. Each staging buffer 34 is connected to a port router 32 of a different network port 12. In the embodiment shown, each staging buffer 34 includes a virtual channel staging buffer 36 for each virtual channel. Multiplexer 38 is used to select a packet from one of the virtual channel staging buffers 36 for transmission to output 20.

Figure 4:
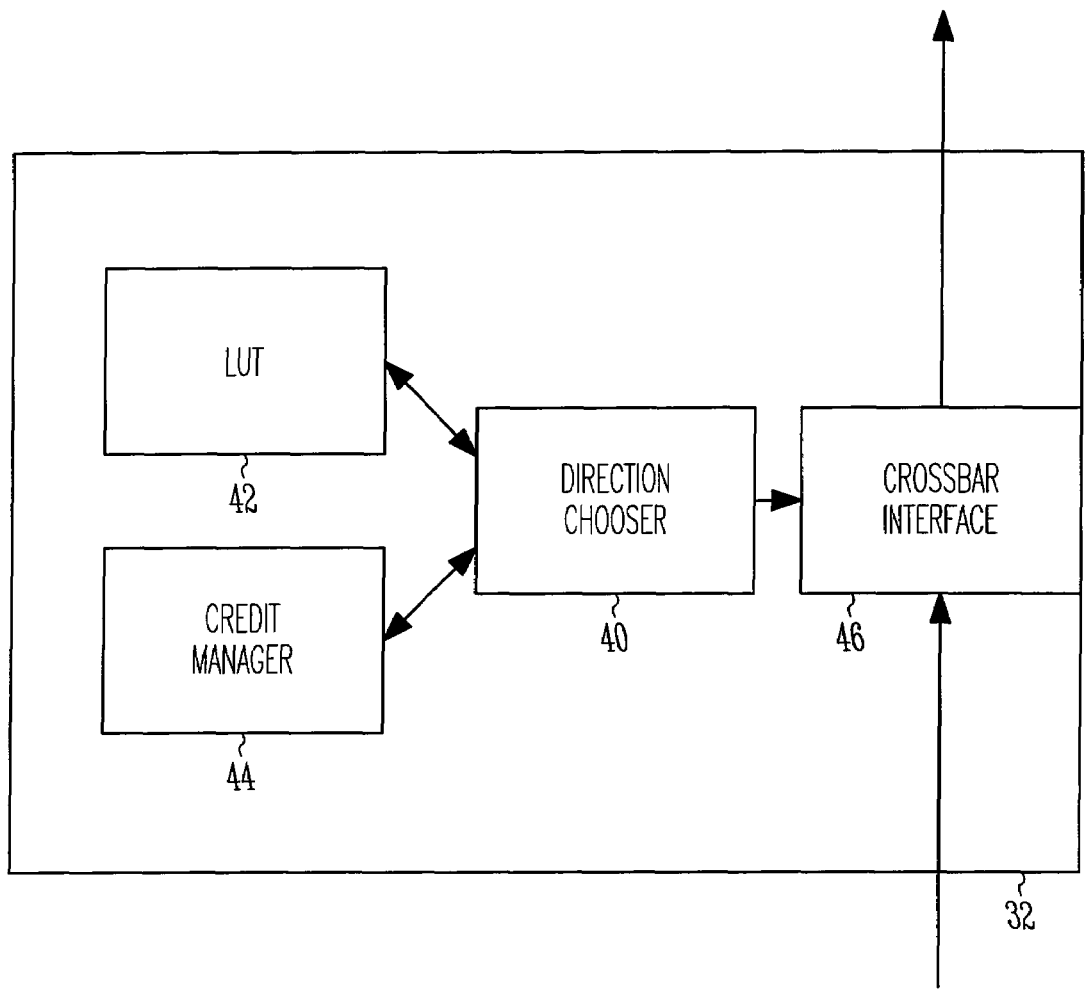
FIG. 4 illustrates a port router.

In one embodiment, each port router 32 includes a direction chooser 40, a look-up table 42, a credit manager 44 and a crossbar interface 46. One such embodiment is shown in FIG. 4.

Router 10 can be used in a computer system 4 having a plurality of nodes 6 connected by a network having a plurality of virtual channels. A packet is received on a first virtual channel associated with a first network port. The packet is stored in the virtual channel input buffer of the first network port corresponding to the first virtual channel. Port router 32 selects a staging buffer 34 associated with a desired virtual channel in a second network port as a destination and forwards the packet to the selected staging buffer, where it is stored. The packet is then read from the selected staging buffer 34 and transmitted on the communications channel of the second network port.

Figure 5:
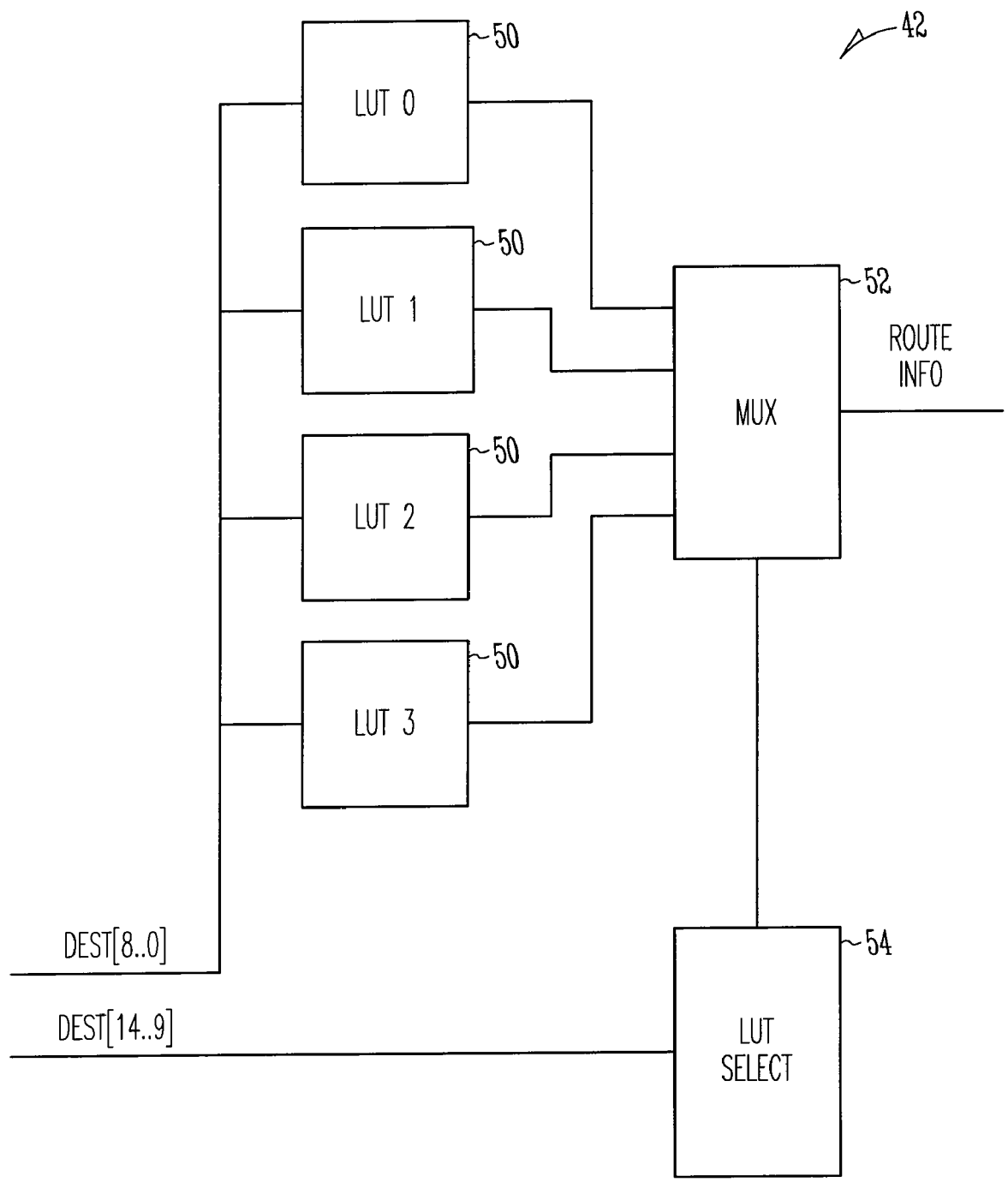
FIG. 5 illustrates a look-up table that can be used in the port router of FIG. 4.

One embodiment of look-up table 42 is shown in FIG. 5. In the embodiment shown in FIG. 5, each look-up table 42 includes four look-up tables 50, a multiplexer 52 and a look-up table select 54. Each look-up table 50 includes 512 route information entries. Bits 14 through 9 of the destination code of the received packet are used to select a route information entry from one of the four look-up tables 50.

In one embodiment, bits 14 through 11 of the destination code are ignored when a bit in a register (such as a memory mapped register (MMR)) is set and, instead, bits 9 and 10 are used to select one of the look-up tables 50. Such an embodiment corresponds to a flat 2 k entry look-up table 42.

Figure 6:
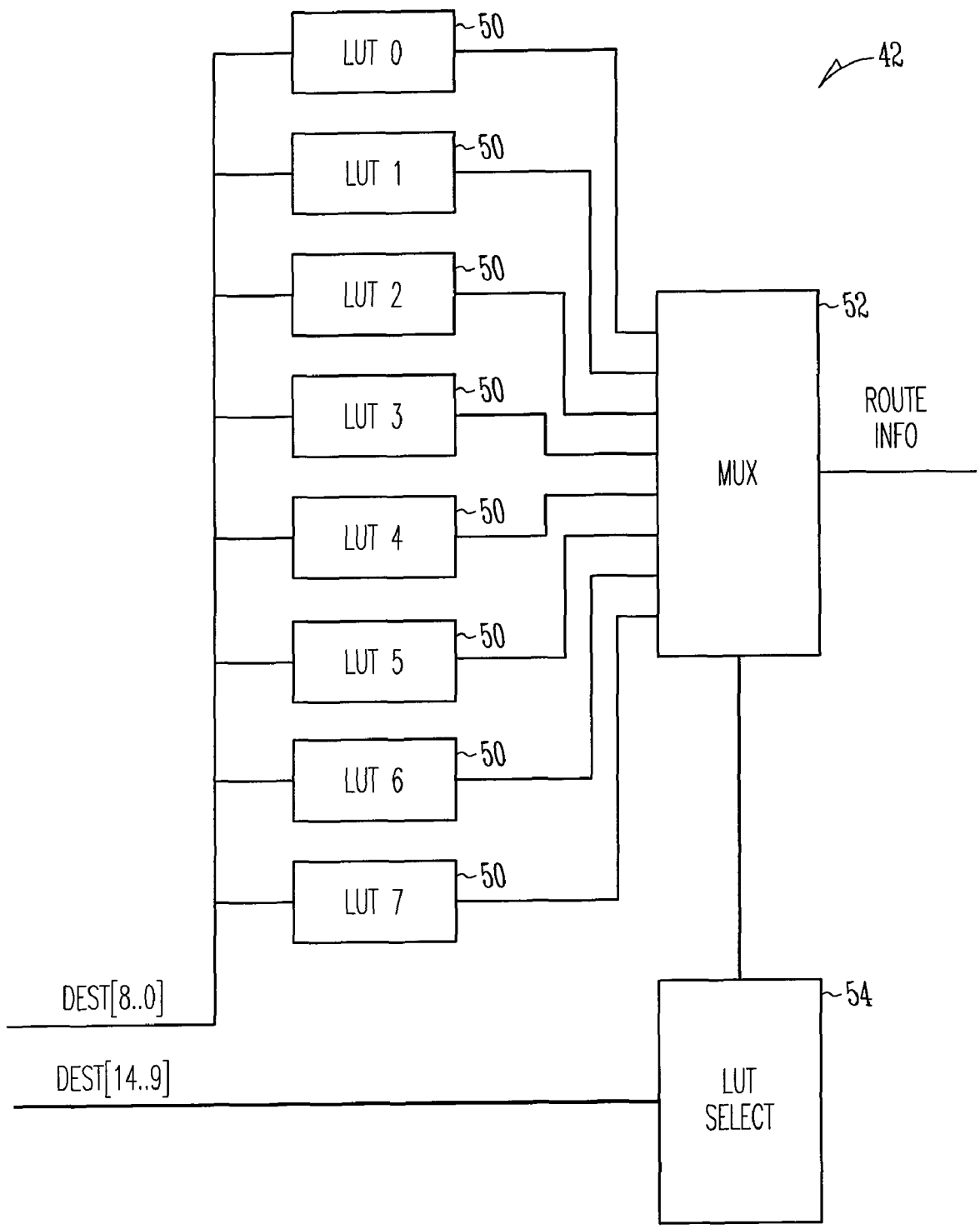
FIG. 6 illustrates and alternate embodiment of a look-up table.

Another embodiment of look-up table 42 is shown in FIG. 6. In the embodiment shown in FIG. 6, each look-up table 42 includes eight look-up tables 50, a multiplexer 52 and a look-up table select 54. Again, each look-up table 50 includes 512 route information entries. Bits 14 through 9 of the destination code of the received packet are used to select a route information entry from one of the eight look-up tables 50.

In one embodiment, bits 14 through 12 of the destination code are ignored when a bit in a register (such as a memory mapped register (MMR)) is set and, instead, bits 11 through 9 are used to select one of the look-up tables 50. Such an embodiment corresponds to a flat 4 k entry look-up table 42.

If, however, bits 14 through 9 are used, one can provide a variety of routes tailored to the application. One embodiment of look-up table select 54 is shown in the table of FIG. 7, where the value of LUT SEL used to select a route information entry from one of the eight look-up tables 50 of FIG. 6 is shown for each combination of destination code bits 14 through 9. As can be seen in the embodiment shown in FIG. 7, destination codes 0x18 through 0x1B can be used with LUTs 2-5 to create a flat 2 k entry look-up table, while the remaining addresses map to more coarse mappings. One can, therefore, create a look-up table 42 with mappings similar to those described by Galles and Passint above. At the same time, one can create very specific mappings tuned to particular applications (e.g., to route around potential congestion areas for a particular application, or due to the interaction of specific applications).

In one embodiment, the bits to be used to address into the LUT select table and the bits used to index into the LUTs can be configured. Such an approach provides additional routing table capabilities.

An advantage of distributed routing according to the present invention is that no global arbitration is needed. Arbitration at the input and at the output is done strictly on the local level. A packet arriving at the input of a network port is reviewed to determine its destination node. The entry corresponding to the destination node is consulted. In one such embodiment, LUT 42 provides a deterministic route output port and a two bit virtual channel (VC) code. The deterministic route output port is the network port 12 to which the packet should be sent if the route is to remain deterministic. The two bit VC code selects the VC, tells the packet to stay on the same VC, or specifies a dateline for torus deadlock avoidance. In one embodiment, datelines switch a packet on VC0 to VC1, and scrub any errant packets on VC1.

Figure 8:
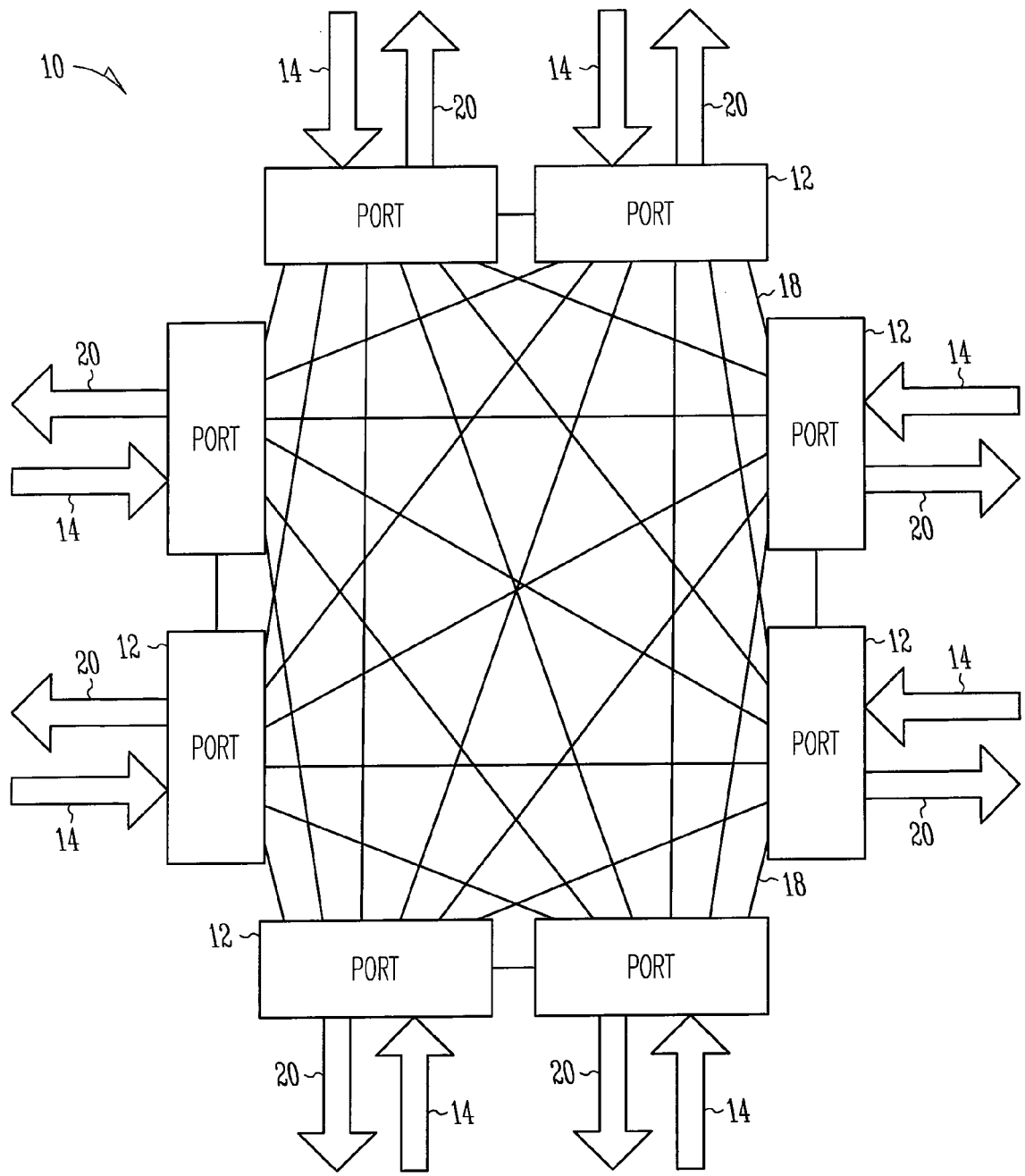
FIG. 8 illustrates an alternate embodiment of a router that can be used in the computer system of FIG. 1.

An alternate embodiment of router 10 is shown in FIG. 8. Router 10 of FIG. 8 includes eight full duplex network ports 12. In one such embodiment, two of the network ports 12 are connected to processors (not shown). The remaining six ports 12 are connected to the network. In one embodiment, data paths 18 between each of the network ports 12 are formed using a crossbar switch.

Router 10 uses a distributed routing table mechanism where a look up table (LUT) at each input port is used to determine the output port. In one embodiment, all routing is virtual cut through, where packets are allowed to move to the destination buffer only if the entire packet fits. This prevents subsequent packets from blocking due to a packet that is straddling a buffer.

Router 10 achieves high performance through a combination of simple arbitration and large buffering. In one embodiment, all routes are traversed using dimension order routing, with the order of traversal being X, Y and then Z dimension.

In one embodiment, each network port 12 supports a plurality of virtual channels. Hardware support is provided to support datelines with two virtual channels per virtual network to allow large-radix tori. In one such embodiment, each input buffer includes a virtual channel input buffer 30 for each virtual channel. Each virtual channel input buffer 30 is capable of storing at least one packet.

Each port 12 includes seven staging buffers 34 (one for each of the other network ports 12). Each staging buffer 34 includes a virtual channel staging buffer for each virtual channel associated with its network port 12.

Figure 9:
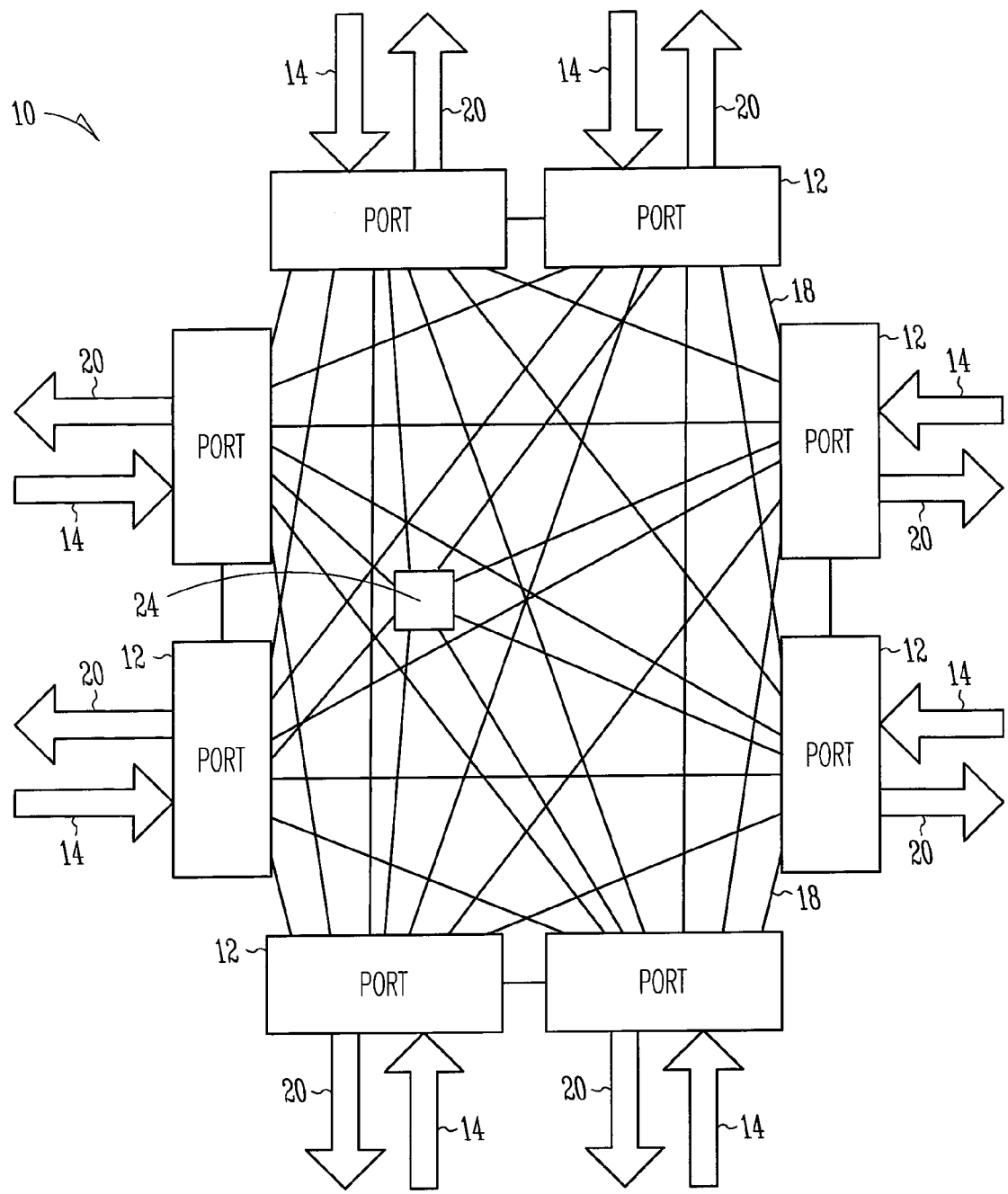
FIG. 9 illustrates another embodiment of a router that can be used in the computer system of FIG. 1.

Yet another alternate embodiment of router 10 is shown in FIG. 9. Router 10 of FIG. 9 includes nine full duplex network ports 12. In one such embodiment, two of the network ports 12 are connected to processors (not shown) and one to a local port 24. The remaining six ports 12 are connected to the network. In one embodiment, data paths 18 between each of the network ports 12 are formed using a crossbar switch.

Local port 24 is associated with control logic within each router 10. In one embodiment, local port 24 is used to read and write from memory mapped registers on router 10. It can also be used to support an external I/O connection.

Once again, router 10 uses a distributed routing table mechanism where a look up table (LUT) at each input port is used to determine the output port. All routing is virtual cut through, where packets are allowed to move to the destination buffer only if the entire packet fits. This prevents subsequent packets from blocking due to a packet that is straddling a buffer.

Each port 12 includes eight staging buffers 34 (one for each of the other network ports 12). Each staging buffer 34 includes a virtual channel staging buffer for each virtual channel associated with its network port 12.

In one embodiment, each port 12 includes a port router 32. Port router 32 includes a direction chooser 40, a look-up table (LUT) 42, a credit manager 44 and a crossbar interface 46 (such as is shown in FIG. 3).

From the input buffer, packets route to a staging buffer of the target port or to the local block/IO port. Arbitration to select which one of the five input virtual channels will use the centralized crossbar is done using a round-robin policy. If the staging buffer for the deterministic {port, vc} pair has enough room to accommodate the entire packet, it is placed in the selected deterministic VC in the selected deterministic direction.

This use of input buffers and output staging buffers and simple routing policy should do a very good job of de-coupling the different directions. Packets come in and get out of the way quickly (into the staging buffers), so that packets behind them going to a different output port are not blocked. Only when staging buffers back up do we get any coupling, and adaptive routing should help this considerably, especially since the virtual cut through routing prevents a packets from blocking half way into a staging buffer with its tail blocking other traffic.

In one embodiment, the router core logic is built on top of a link control block (LCB), which provides reliable delivery of packets across links using a sliding-window, CRC-based transmission protocol. Packets are broken into one or more flits, the basic unit of flow control. Flits are transmitted across links in micropackets, which contain two flits, plus sideband information including flow control acknowledgements and error detection codes.

In one embodiment, router 10 uses a credit based flow control mechanism for communication between routers. Each router that transmits a packet maintains transmission credits for each virtual channel (vc) representing the number of flits that the transmitter is allowed to send on that vc. It can only send a packet on a vc if the transmission credit for that vc is at least as high as the number of flits in the packet. When it sends a packet on a vc, it decrements the transmission credit for that vc by the size of the packet. When it receives an ack for a vc, it increments the associated transmission credit by the ack granularity (e.g., by two).

Each input port has a Credit Manager 44 that handles the credit counters. Conceptually, the Credit Manager 44 at each input port is an array of counters, CreditsToSend[vc], one counter for each virtual channel. When a flit is removed from the input buffer, the CreditsToSend[vc] counter for that VC is incremented. If, for example, the ack granularity is two, the router core logic accumulates two acks before it signals the LCB to send an ack in the sideband. We have found that a fixed ack granularity of two allows us to maintain ack bandwidth under heavy traffic, since the micropacket can encode only a single ack per virtual channel for every two flits in the micropacket.

If the CreditsToSend[vc] counter is greater or equal to two (using that same example), then the router core logic must assert an ACK signal to the LCB and decrement the CreditsToSend[vc] counter by two. The LCB will simply stuff the ack into the sideband of an outgoing micropacket, or create an IDLE packet with the appropriate VC ack bits set.

Router 10 trades off staging buffer space for simple arbitration. Each input port operates completely independently in choosing output ports and in routing packets to staging buffers.

Each output port operates completely independently as well, and can do simple round-robin arbitration amongst the staging buffers. To guarantee fairness and forward progress for all packets, arbitration should be done in two stages: round robin arbitration across the 8 staging buffers should be done independently for each of the virtual channels, and then the five virtual channels should arbitrate for the physical output. This avoids the situation in which the arbiter comes around periodically to a packet within a given staging buffer vc and skips it because its vc is blocked at the moment, only to move on to another staging buffer and allow a packet in that buffer to grab the aforementioned vc, so that when the arbiter comes back to the skipped packet the vc will be busy again and the packet will be skipped again.

In one embodiment, input buffers 30 are sized to hide the round trip latency of transferring a packet from one node to the next node and receiving an acknowledgment when the packet is consumed. Staging buffers 36 are sized to cover the round trip latency of transmitting between an input buffer and a staging buffer on chip. In one embodiment, the buffers are sized such that they hold a full packet, plus cover the round latency at full bandwidth.

Packet aging can be used instead of straight round robin arbitration to give priority to older packets. In packet aging arbitration a global age is kept for all packets in the network, and virtual channel and physical channel arbitration policies are modified accordingly. Methods of handling aging are described in related U.S. patent application Ser. No. 11/932,413, entitled "Reduced Arbitration Routing System and Method", filed on even date herewith, the descriptions of which is incorporated herein by reference.

Figure 10:
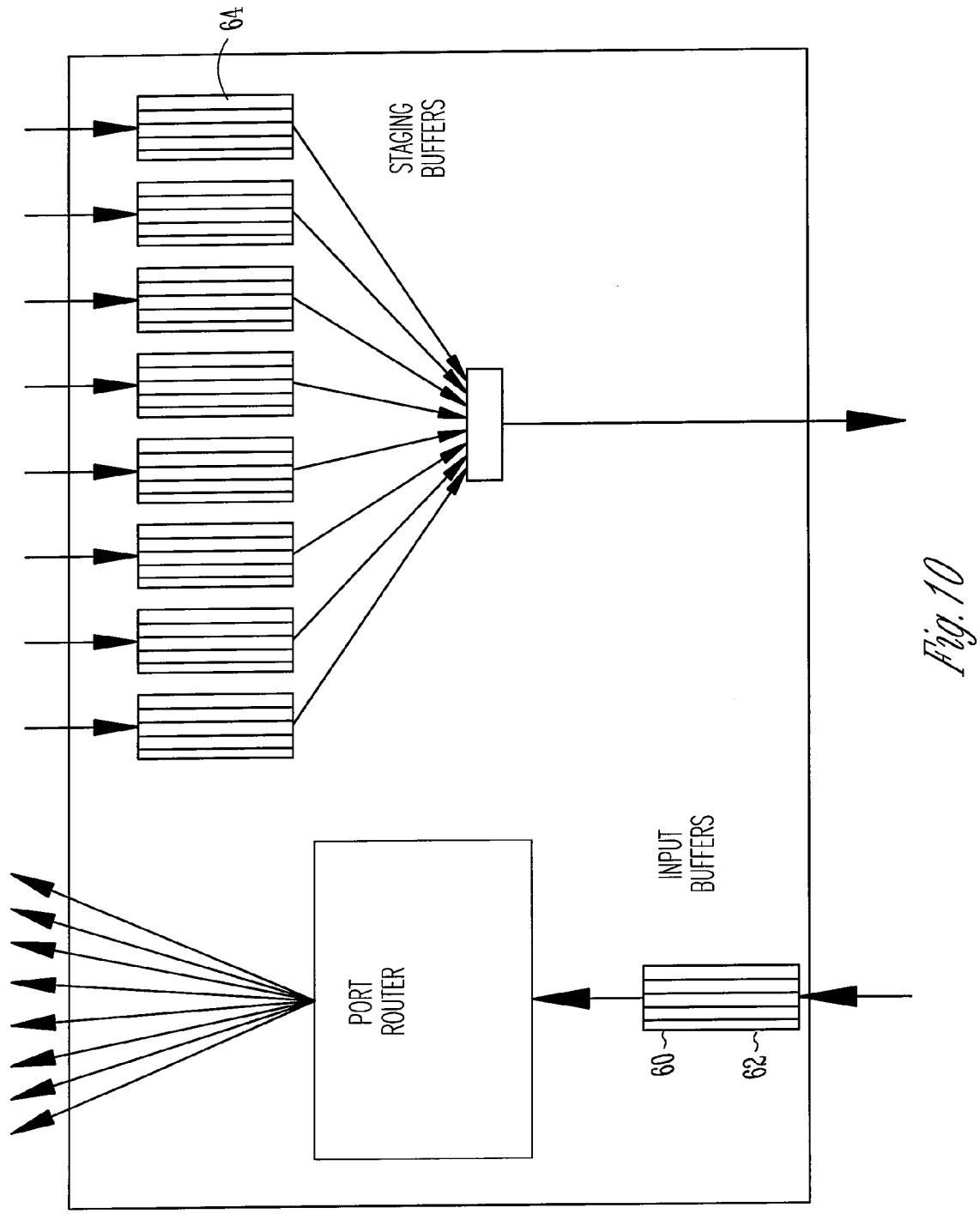
FIG. 10 illustrates an embodiment of an adaptive router.

In one embodiment, router 10 supports adaptive routing. In one such embodiment, each network port 12 includes buffers 60 for five virtual channels. The five virtual channels include two request virtual channels, two respond virtual channels and one adaptive virtual channel. An example of such an embodiment is shown in FIG. 10. The two request virtual channels can be used to allow a torus wraparound ring in a dimension without the possibility of deadlock in that dimension.

From input buffer 60, packets route to a staging buffer 64 of the target port or to the local block/IO port. Arbitration to select which one of the five input virtual channels 62 will use the centralized crossbar is done using a round-robin policy. If the staging buffer 64 for the deterministic {port, vc} pair has enough room to accommodate the entire packet, it is placed in the selected deterministic VC in the selected deterministic direction. Otherwise, when the deterministic staging buffer is full above some high water mark, and there is room for the packet in the adaptive VC staging buffer of one of the available adaptive directions, then the packet is routed to the adaptive VC in one of the adaptive directions. When multiple adaptive alternatives are available, the direction taken is selected by which buffer has the most space.

In one adaptive routing embodiment, a read of LUT 42 based on the destination address stored in the packet returns three output fields used to route the packet. The first, the deterministic route output port, is discussed above. The second field, a mask of allowable adaptive output ports, is used to determine if the packet is eligible to route adaptively. This mask is cleared if the packet is not marked as adaptive. The last field, a two bit VC code, selects the VC, tells the packet to stay on the same VC, or specifies a dateline for torus deadlock avoidance. Datelines switch a packet on VC0 to VC1, and scrub any errant packets on VC1.

In the above discussion, the term "computer" is defined to include any digital or analog data processing unit. Examples include any personal computer, workstation, set top box, mainframe, server, supercomputer, laptop or personal digital assistant capable of embodying the inventions described herein.

Examples of articles comprising computer readable media are floppy disks, hard drives, CD-ROM or DVD media or any other read-write or read-only memory device.

Portions of the above description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system=s registers and memories into other data similarly represented as physical quantities within the computer system memories or registers or other such information storage, transmission or display devices.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is intended that this invention be limited only by the claims and the equivalents thereof.

What is claimed is:

1. A router, comprising:
   a plurality of network ports; and
   one or more data paths connecting the plurality of network ports;
   wherein each network port supports a plurality of virtual channels, wherein each network port includes:
      an input;
      an output;
      a plurality of staging buffers coupled to the output, each of the staging buffers connected to a port router of a different network port;
      a multiplexer, connected to the plurality of staging buffers and to the output, for selecting data from the staging buffers to be transferred to the output; and
      an input buffer connected to the input, wherein the input buffer includes a port router and a virtual channel input buffer for each of a plurality of virtual input channels, wherein the port router includes a plurality of look-up tables (LUTs) and a LUT select, wherein the plurality of LUTs include route information associated with two or more destination code bits and wherein the LUT select chooses the LUT to use as a function of a plurality of destination code bits;
   wherein each virtual channel input buffer receives data from the input corresponding to an associated one of the plurality of virtual channel input buffers and wherein the port router selects a packet from one of the virtual channel input buffers and sends the selected packet to one of the other network ports; wherein each port includes a staging buffer associated with each of the other network ports, wherein each staging buffer includes a virtual channel staging buffer associated with each virtual channel and wherein each staging buffer is sized to permit virtual cut through routing.

2. The router of claim 1, wherein each LUT provides a deterministic route output port and a two bit virtual channel (VC) code.

3. The router of claim 1, wherein each LUT provides a deterministic route output port, a mask of allowable adaptive output ports and a two bit virtual channel (VC) code, wherein the mask of allowable adaptive output ports is used to determine if the packet is eligible to route adaptively.

4. The router of claim 1, wherein the one or more data paths are implemented as a crossbar switch.

5. The router of claim 1, wherein each output performs arbitration among all its associated staging buffers.

6. The router of claim 5, wherein arbitration is based on packet aging.

7. In a router having a plurality of ports, wherein each port includes an input and an output for communication with a network node external to the router, a plurality of look-up tables (LUTs) and a look-up table select connected to the LUTs, a method of determining how to route a packet between ports, comprising:
   loading routing information into each of the plurality of LUTs;
   loading LUT selection information in the look-up table select; wherein the LUT select chooses the LUT to use as a function of a plurality of destination code bits;
   receiving, at a first port, a packet having a plurality of destination bits;
   selecting a second port to receive the packet, wherein selecting includes applying two or more of the destination bits to the plurality of LUTs in the first port and selecting an output of the plurality of LUTs as a function of one or more of the destination bits, wherein the selected output indicates the second port selected to receive the packet; and
   routing the packet to the output of the selected port, wherein each port includes a staging buffer associated with each of the other network ports, wherein each staging buffer includes a virtual channel staging buffer associated with each virtual channel, wherein each staging buffer is sized to permit virtual cut through routing; and wherein routing includes arbitrating between input buffers in each of the input ports.

8. The method of claim 7, wherein loading route information includes loading a deterministic route output port and a two bit virtual channel (VC) code for each entry in the LUT.

9. The method of claim 7, wherein loading route information includes loading a deterministic route output port, a mask of allowable adaptive output ports and a two bit virtual channel (VC) code; and
   wherein selecting the port includes determining, as a function of the mask of adaptive output ports, if the packet is eligible to route adaptively.

10. The method of claim 7, wherein routing includes arbitrating between input buffers in each of the input ports.

11. The router of claim 10, wherein routing includes arbitrating between staging buffers.

12. The router of claim 10, wherein routing includes arbitrating between staging buffers based on packet aging.

* * * * *